United States Patent [19]

Krebs

[11] Patent Number: 4,547,012

[45] Date of Patent: Oct. 15, 1985

[54] TIRE LOADER

[75] Inventor: Gerd Krebs, Hamburg, Fed. Rep. of Germany

[73] Assignee: Fried. Krupp Gesellschaft mit beschrankter Haftung, Essen, Fed. Rep. of Germany

[21] Appl. No.: 487,587

[22] Filed: Apr. 22, 1983

[30] Foreign Application Priority Data

Apr. 28, 1982 [EP] European Pat. Off. ......... 82103605.0

[51] Int. Cl.⁴ .............................................. B66C 1/54
[52] U.S. Cl. ..................................... 294/93; 294/67.1
[58] Field of Search ....................... 294/93, 94, 95, 96, 294/97, 88, 67 R, 86.24; 414/910, 911; 74/586; 308/3 R; 425/36, 38

[56] References Cited

U.S. PATENT DOCUMENTS

| | | | |
|---|---|---|---|
| 2,642,307 | 6/1953 | Olson | 294/67 R |
| 3,380,115 | 4/1968 | Sonderquist | 294/93 |
| 3,393,807 | 7/1968 | Sylvester et al. | 294/93 |

FOREIGN PATENT DOCUMENTS

| | | | |
|---|---|---|---|
| 0003418 | 8/1979 | European Pat. Off. | 294/93 |
| 1579287 | 3/1976 | Fed. Rep. of Germany | 294/93 |
| 2000973 | 11/1977 | Fed. Rep. of Germany | 294/93 |

Primary Examiner—James B. Marbert
Attorney, Agent, or Firm—Karl F. Ross; Herbert Dubno

[57] ABSTRACT

A tire loader has a support defining an upright axis and at least three like abutments angularly equispaced about and radially equispaced from the axis on the support. A plate pivotal about the axis on the support within the abutments carries at least three respective inner pivots angularly equispaced about and radially equispaced from the axis on the plate. At least three respective arms each have radially inner ends pivoted on the respective pivots and outer ends. Each arm bears angularly on the respective abutment. At least three respective bead-engaging shoes are pivoted on the outer ends of the respective arms. An actuator operatively connected between the support and the plate can rotate the plate about the axis on the support and thereby pivot the arms about the inner pivots and move the shoes radially. The abutments are rollers having respective roller axes parallel to the support axes. Each of the arms is displaceable between an inner position extending generally tangentially of the axis and with its inner end closely juxtaposed with the outer end of the trailing arm and an outer position extending radially outward and forming an acute angle with a radius drawn from the axis through the respective inner pivot.

9 Claims, 3 Drawing Figures

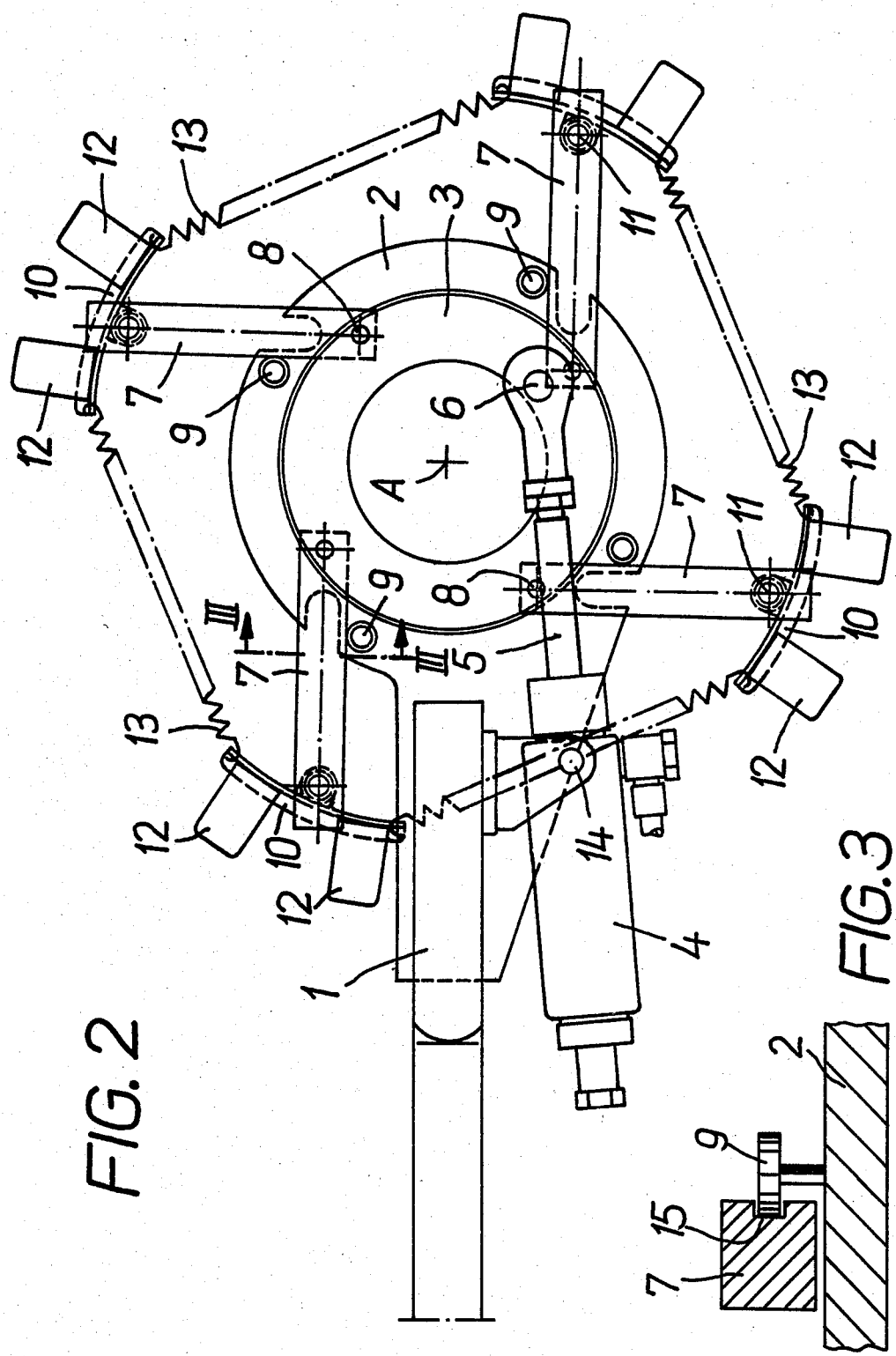

TIRE LOADER

FIELD OF THE INVENTION

The present invention relates to a tire loader. More particularly this invention concerns such an apparatus which picks up a tire core or carcass and which holds it in a tire-curing press or the like.

BACKGROUND OF THE INVENTION

A tire loader is described in European patent application 3,418 based on U.S. patent application Ser. No. 872,421 filed Jan. 16, 1978 by A. P. Singh and published Aug. 6, 1979 which is used to pick up and position a tire in a tire press. This device has a support centered on an axis and provided with a plurality of angularly equispaced and radially extending guides carrying respective bead-engaging shoes that can slide radially of the support on these guides. A plate pivoted on the support at the axis is connected at inner pivots to the inner ends of a plurality of angularly equispaced links whose outer ends are pivoted on the respective shoes. A fluid-powered actuator is connected between the plate and the support to pivot the plate on the support about the axis. As the inner pivots are moved into a position aligned radially between the outer link ends and the axis, that is in a position with the links extending more radially than tangentially, the shoes move synchronously outward and as the links are moved out of the radial position the shoes move inward.

This type of arrangement, as well as similar equipment described in U.S. Pat. No. 3,167,810, 3,380,115, and 3,564,649 of Soderquist and U.S. Pat. No. 3,845,979 Schatz et al, serves to pick up a tire to be cured or otherwise acted on in a tire press by engaging its upper bead radially outward. This allows the tire core or carcass to be suspended accurately in the tire machine in the desired horizontal position, that is with the tire axis vertical and the tire lying generally in a horizontal plane.

The main problem with such a machine is that it requires constant first-class maintenance to keep it working properly. If any one shoe sticks and does not move prefectly synchronously the core will not be centered in the curing press and the resultant finished tire will be defective. Since the vulcanizing and curing machines operate hot, it is difficult to keep the tire loader working smoothly due to the problems of thermal expansion and constraction and drying-up of lubricants.

OBJECTS OF THE INVENTION

It is therefore an object of the present invention to provide an improved tire loader.

Another object is the provision of a tire loader which overcomes the above-given disadvantages.

Yet another object is to provide a tire loader which is simple in construction, but wherein perfectly synchronous movement of the bead-engaging shoes is ensured.

SUMMARY OF THE INVENTION

These objects are attained according to the instant invention in a tire loader having a support defining an upright axis and at least three like abutments angularly equispaced about and radially equispaced from the axis on the support. A plate pivotal about the axis on the support within the abutments carries at least three respective inner pivots angularly equispaced about and radially equispaced from the axis on the plate. At least three respective arms each have radially inner ends pivoted on the respective pivots and outer ends. Each arm bears angularly on the respective abutment. At least three respective bead-engaging shoes are pivoted on the outer ends of the respective arms. An actuator operatively connected between the support and the plate can rotate the plate about the axis on the support and thereby pivot the arms about the inner pivots and move the shoes radially.

Such a mechanism is extremely simple and can be counted on to operate accurately with minimal maintenance. Since the arm only engages the abutment with one side, size variations due to thermal expansion and contraction are largely irrelevant. At the same time synchronous displacement of the shoes is ensured.

According to features of this invention the abutments are rollers having respective roller axes parallel to the support axes. In this manner friction is very low. In addition each of the arms can have a longitudinal edge formed with a longitudinal slot in which the respective roller engages. This structure, while remaining quite simple, prevents canting of the arms from positions in a plane perpendicular to the axis. The rollers according to this invention have a wear- and temperature-resistant coating, and two rollers spaced apart by the arm width can be used to guide it.

Each of the arms is displaceable between an inner position extending generally tangentially of the axis and with its inner end closely juxtaposed with the other end of the trailing arm and an outer position extending radially outward and forming an acute angle with a radius drawn from the axis through the respective inner pivot. In addition the system has at least three respective tension springs extending generally tangentially of the axis and operatively connected between the outer arm ends. Each of the shoes has two angularly oppositely directed ends connected to the respective springs. In addition the shoes are pivotal on the outer arm ends about respective outer pivot axes parallel to the support axis, angularly equispaced thereabout, and radially equispaced therefrom. These shoes each include a respective pair of horizontally and radially outwardly projecting tabs flanking the respective outer axis. Each of the shoes has a radially outwardly convex outer surface.

The actuator according to this invention is a pneumatic cylinder pivoted on the support and plate. Thus controlling pressure is extremely easy.

DESCRIPTION OF THE DRAWING

The above and other features and advantages will become more readily apparent from the following, reference being made to the accompanying drawing in which:

FIG. 2 is a view like FIG. 1 of the loader in the carrying or holding position; and FIG. 3 is a large-scale sectional view taken along line III—III of FIG. 2.

SPECIFIC DESCRIPTION

Figure 1:
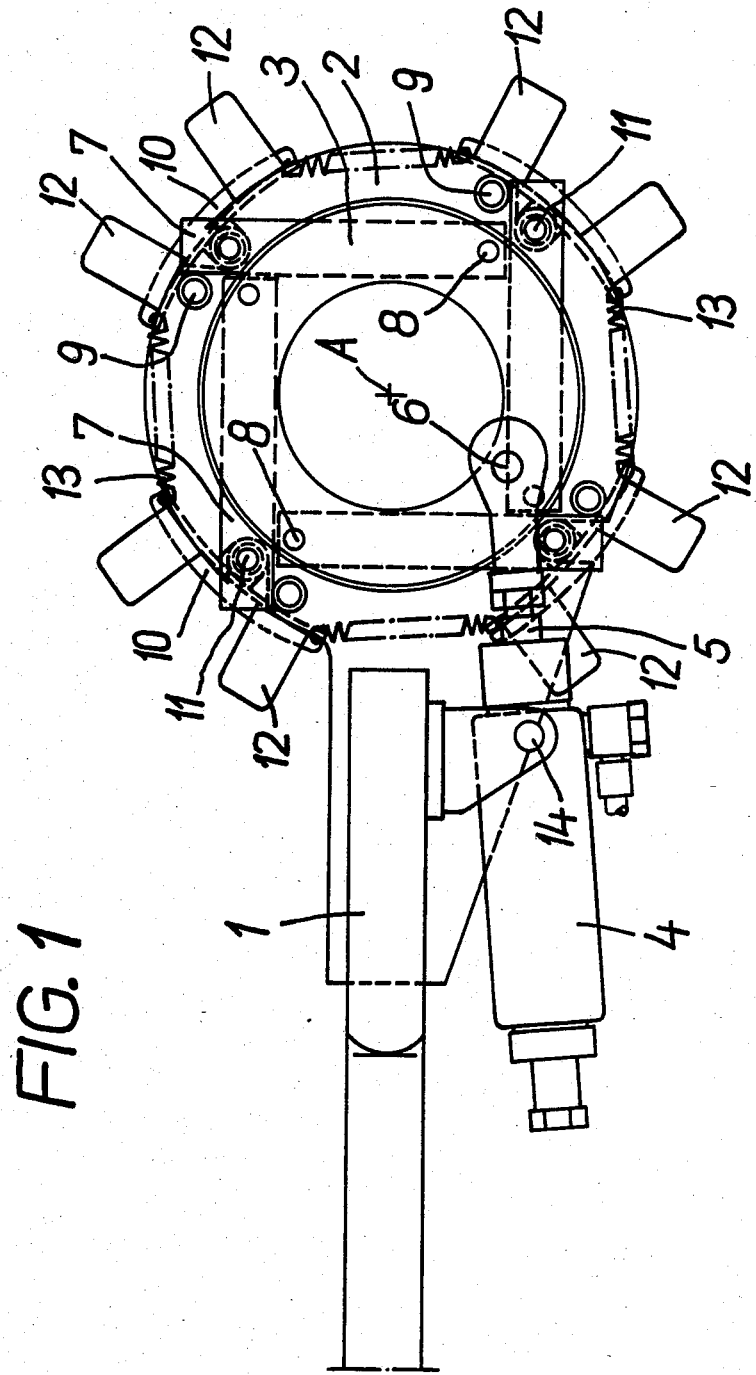
FIG. 1 is a top view of the tire loader according to this invention in the tire-engaging and -releasing position.

As seen in FIGS. 1 and 2 the machine according to this invention has a support arm or member 1 to whose outer end is secured an annular outer support plate or ring 1 centered on an axis A. An inner carrier ring 3 is rotatable about and centered on this axis A in the ring 2 by means of appropriate interfitting inner and outer edges on the rings 2 and 3.

Four arms 7 angularly equispaced about the axis A have inner ends pivoted at 8 about respective axes parallel to, radially equispaced from, and angularly equispaced about the axis A on the carrier ring 3 and outer ends defining pivots 11 parallel to and equispaced from the respective pivots 8. Respective arcuate shoes 10 having upper centering tabs 12 are pivoted on these outer arm ends at the pivots 11. Four respective abutment rollers 9 angularly equispaced about and radially equispaced from the axis A on the support ring 2 engage the arms 7 radially generally outwardly. Tension springs 13 extending tangentially of a cylinder centered on the axis A and lying generally at the pivots 11 are hooked between adjacent ends of the shoes 10 so as to urge all the pivots 11 radially inward toward the axis A and against the rollers 9.

The rollers 9 engage in groves 15 formed in the longitudinal edges of the respective arms 7. Thus canting of the arms 7 relative to the rings 2 and 3 is impossible.

A heavy-duty pneumatic cylinder 4 pivoted on the support 1 about an axis 14 parallel to the axis A has a piston rod 5 pivoted at 6 on the carrier ring 3 offset from the axis A so that expansion and retraction of this cylinder 4 rotates the ring 3 about the axis A in the ring 2.

In the position illustrated in FIG. 1 the arms 7 lie on a rectangle, with the outer end of each arm 7 and its respective roller 9 closely juxtaposed with the inner end of one of the adjacent arms 7 at the pivot 8 thereof. The springs 13 are under tension so that the outer faces of the arcuate shoes 10 lie generally on an imaginary cylinder centered on the axis A. The shoes 10 can be lowered down into the central hole of a tire carcass to be picked up with the machine axis A and the tire axis coaxial and vertical, until the tabs 12 engage against the top of the tire carcass or come to a position slightly thereabove.

The cylinder 4 is then expanded to rotate the ring 3 counterclockwise and to move the inner pivots 8 angularly toward the rollers 9 of the respective arms 7. Since the rollers 9 lie radially outside the inner pivots 8, this action swings the arms 7 out from the tangential position of FIG. 1 to the more radially extending position of FIG. 2. In fact the arms 7 could theoretically even be pivoted further than illustrated, but not past a preferably radial position in which the system would become metastable.

In the FIG. 2 extended position of the arms 7 the shoes 10 remain perfectly centered by tension springs 13. Thermal expansion and contraction of the various parts relative to each other is not a problem, as the ring 3 is guided all around in the ring 2 so it can be a relatively loose fit and the arms 7 are only guided on one longitudinal edge.

The cylinder 4 can be pressurized such that the shoes 10 will not exert potentially damaging force on the inner edge of the upper bead, or can be connected to a system which cuts off air feed once a certain internal pressure is reached. In this manner the system need not be readjusted for tires of different sizes, other than by possibly changing the shoes 10 for ones of a different radius of curvature.

I claim:
1. A tire loader comprising:
   a support having an upright axis;
   at least three like abutments angularly equispaced about and radially equispaced from the axis on the support;
   a plate pivotal about the axis on the support within the abutments;
   at least three respective inner pivots angularly equispaced about and radially equispaced from the axis on the plate;
   at least three respective arms each having radially inner ends pivoted on the respective pivots and outer ends, each arm having an edge bearing angularly on the respective abutment;
   biasing means operatively connected between the outer arm ends for urging the outer arm ends radially inward and thereby pressing the edge of each arm angularly against the respective abutment;
   at least three respective bead-engaging shoes pivoted on the outer ends of the respective arms; and
   means including an actuator operatively connected between the support and the plate for rotating the plate about the axis on the support and thereby pivoting the arms between inner positions extending generally tangentially of the axis and outer positions extending generally radially outward therefrom about the inner pivots, sliding the arm edges along the respective abutments, and moving the shoes radially.
2. The tire loader defined in claim 1 wherein the abutments are rollers having respective roller axes parallel to the support axes.
3. The tire loader defined in claim 2 wherein each of the arms has a longitudinal edge formed with a longitudinal slot in which the respective roller engages.
4. The tire loader defined in claim 1 wherein the biasing means includes at least three respective tension springs extending generally tangentially of the axis.
5. The tire loader defined in claim 4 wherein each of the shoes has two angularly oppositely directed ends connected to the respective springs.
6. The tire loader defined in claim 5 wherein the shoes are pivotal on the outer arm ends about respective outer pivot axes parallel to the support axis, angularly equispaced thereabout, and radially equispaced therefrom.
7. The tire loader defined in claim 6 wherein the shoes each include a respective pair of horizontally and radially outwardly projecting tabs flanking the respective outer axis.
8. The tire loader defined in claim 6 wherein each of the shoes has a radially outwardly convex outer surface.
9. The tire loader defined in claim 1 wherein the actuator is a pneumatic cylinder pivoted on the support and plate.

* * * * *